US011379945B2

(12) United States Patent
Richter et al.

(10) Patent No.: US 11,379,945 B2
(45) Date of Patent: Jul. 5, 2022

(54) GRAYSCALE HISTOGRAM GENERATION

(71) Applicant: GOOGLE LLC, Mountain View, CA (US)

(72) Inventors: John Mark Richter, Boulder, CO (US); Peter Joseph McNerney, Frederick, CO (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/296,920

(22) PCT Filed: Feb. 27, 2019

(86) PCT No.: PCT/US2019/019891
§ 371 (c)(1),
(2) Date: May 25, 2021

(87) PCT Pub. No.: WO2020/176087
PCT Pub. Date: Sep. 3, 2020

(65) Prior Publication Data
US 2021/0358074 A1    Nov. 18, 2021

(51) Int. Cl.
*G06T 1/20* (2006.01)
*G06T 1/60* (2006.01)
(Continued)

(52) U.S. Cl.
CPC ............ *G06T 1/20* (2013.01); *G06T 1/60* (2013.01); *G06T 5/40* (2013.01); *G06V 10/50* (2022.01)

(58) Field of Classification Search
CPC ....... G06T 15/506; G06T 15/50; G06T 15/60; G06T 15/80; G06T 15/06; G06T 15/04;
(Continued)

(56) References Cited

U.S. PATENT DOCUMENTS

| 2013/0038622 A1* | 2/2013 | Yang .................. G09G 3/344 |
| | | 345/589 |
| 2013/0044809 A1* | 2/2013 | Chong ................. H04N 19/182 |
| | | 375/240.03 |

FOREIGN PATENT DOCUMENTS

RO           127451 A2      5/2012

OTHER PUBLICATIONS

Oliver Fluck et al: "GPU Histogram Computation", International Conference on Computer Graphics and Interactive Techniques, ACM Siggraph 2006 Papers, Boston, MA XP 058144331, Abstract, p. 1.

(Continued)

*Primary Examiner* — Todd Buttram
(74) *Attorney, Agent, or Firm* — Dority & Manning, P.A.

(57) ABSTRACT

In a graphics processing unit (GPU), receiving an input image comprising an array of pixels. Each pixel having a gray scale value from a range of N grayscale values. For each particular input patch of pixels of a set of input patches partitioning the input image and in parallel for each particular grayscale value the range, counting the number of pixels in the particular input patch having the particular grayscale value. In parallel for each particular input patch of pixels of a set of input patches partitioning the input image, creating an output image patch as an ordered sequence of N pixels, with the color value of the nth pixel in each corresponding output patch representing the count of pixels in the particular input patch having the nth grayscale value. Combining the output image patches into a single composite output image of N pixels, the pixel value of the nth pixel in the single composite output image corresponding to the count of pixels in the input image having the nth grayscale value.

18 Claims, 10 Drawing Sheets

(51) Int. Cl.
　　　*G06T 5/40*　　　　(2006.01)
　　　*G06K 9/46*　　　　(2006.01)
　　　*G06V 10/50*　　　(2022.01)
(58) Field of Classification Search
　　　CPC ....... G06T 15/005; G06T 1/60; G06T 15/503;
　　　　　　　G06T 11/001; G09G 5/02; G09G 5/10;
　　　　　　　G09G 5/06; G09G 2320/0666; G09G
　　　　　　2320/0626; G09G 3/2051; G09G 3/2055;
　　　　　　　　　G09G 2320/0247; G09G 2320/0261;
　　　　　　　　　　　　　　　　　　G09G 2320/0266
　　　See application file for complete search history.

(56) References Cited

OTHER PUBLICATIONS

Aaftab Munshi: "OpenCL Programming Guide", Dec. 31, 2012, pp. 393-406, retreieved from the Internet: URL:http://asu-cs.donntu.org/sites/default/files/images/doc/opencl.programming.guide.pdf.
Jens Kruger et al: "Linear algebra operators for GPU implementation of numerical algorithms", Jul. 31, 2005.
Thorsten Scheurmann et al: "Efficient histogram generation using scattering on GPU's" 13D 2007, ACM Siggraph Symposium on Interactive 3D Graphics and Games, Seattle, Washington, Apr. 30-May 2, 2007.

* cited by examiner

200

Receive an input image comprising an array of pixels, each pixel having a grayscale value from a range of $N$ grayscale values
210

In parallel for each particular input patch of pixels of a set of input patches partitioning the input image, and in parallel for each particular grayscale value in the range, count the number of pixels in the particular input patch having the particular grayscale value
220

Match each instance of the reported received pairing data with zero or one instances of the reported pairing broadcast data
230

Combine the output image patches into a single composite output image of $N$ pixels
240

FIG. 2

GRAYSCALE HISTOGRAM GENERATION

CROSS-REFERENCE TO RELATED APPLICATIONS

The present application is a National Stage Application, filed under 35 U.S.C. 371, of International Patent Application No. PCT/US2019/019891 filed on Feb. 27, 2019 titled "GRAYSCALE HISTOGRAM GENERATION," the entirety of which is incorporated by reference herein.

TECHNICAL FIELD

The technology disclosed herein is related to graphics processing. Particular examples relate to generating histograms on graphics processing units (GPUs).

BACKGROUND

A GPU is an electronic subsystem (typically a chipset) designed to rapidly process images intended for output to a display device. GPUs are used in embedded systems, mobile phones, personal computers, workstations, digital cameras, game consoles, and other digital systems. The highly parallel structure of the GPU makes it more efficient than a general-purpose central processing unit (CPU) for certain tasks.

An image histogram is a typically two-dimensional data structure that describes the number of pixels of an image across a range of color values. Conventionally, the range of color values forms the x-axis, and the number of pixels forms the y-axis—with darker colors at the lower x-axis values. A large number of tasks in image processing (for example, thresholding) involve creating a histogram of image color values. In thresholding, each pixel in an image is replaced with a black pixel if the image intensity for the pixel is less than a fixed constant T, or a white pixel if the image intensity is greater than that constant. These sorts of histograms are most often used for tasks like edge detection, color correction, image segmentation, co-occurrence matrices, and black-and-white image conversion, which can be prerequisites for more complex image analysis tasks like object and text recognition.

SUMMARY

The technology described herein includes computer implemented methods, computer program products, and systems to create grayscale histograms of input images. In some examples of the technology, a GPU receives an input image comprising an array of pixels. Each pixel has a grayscale value from a range of N grayscale values. For each particular input patch of pixels of a set of input patches partitioning the input image and in parallel for each particular grayscale value the range, the GPU counts the number of pixels in the particular input patch having the particular grayscale value. In parallel for each particular input patch of pixels of a set of input patches partitioning the input image, the GPU creates an output image patch as an ordered sequence of N pixels, with the color value of the nth pixel in each corresponding output patch representing the count of pixels in the particular input patch having the nth grayscale value. The GPU then combines the output image patches into a single composite output image of N pixels, the pixel value of the nth pixel in the single composite output image corresponding to the count of pixels in the input image having the nth grayscale value.

In some examples for a hierarchical partition of the set of output image patches, wherein each hierarchical node has at least two children, the GPU sums from the lowest level to the highest level, each nth pixel value. In some such examples, each output image patch is a 16×16 pixel array and each parent other than the hierarch has four children.

In some examples, the color value of each pixel in an output image patch is formatted in OpenGL RBGA unsigned integral format as a base 256 number with "R" as the least significant place, and "A" is the most significant place. In some such examples, "A" is formatted as a base 256 complement. In some such examples, each output image patch is a 16×16 pixel array.

In some examples, counting the number of pixels, creating the corresponding output image patch, and combining the output image patches into a single composite image is performed on the GPU using one or more fragment shaders.

BRIEF DESCRIPTION OF THE DRAWINGS

FIG. 2 is a block diagram illustrating methods to create grayscale histograms of input images, in accordance with certain examples.

DETAILED DESCRIPTION OF THE EXAMPLES

Traditional methods for calculating histograms are prohibitively time consuming when performing image processing on a device with a GPU, particularly with the GPUs typically found in mobile devices. While there are approaches for generating an image histogram using a device's CPU, such approaches perform poorly on a GPU, for example, requiring 256 full scans of the entire input image for a grayscale image. Further, GPUs are typically tailored to processing image data structures, and not histograms.

Examples of the technology disclosed herein can generate image histograms on a GPU, in some instances in a small number O(log N) of fast GPU passes—where "O(*)" represents "on the order of" and "N" is the number of pixels processes. The results can be made available to other GPU-implemented processes of the image processing pipeline without having to copy the results between the GPU, CPU, and system memory. Such copying is a relatively expensive operation that may introduce undesirable latency in real-time image processing applications.

By using and relying on the methods and systems described herein, the technology disclosed herein can create image histograms on a device's GPU without relying on the device's CPU. As such, the technology may be employed to perform image processing tasks such as thresholding, edge detection, color correction, image segmentation, co-occurrence matrices, black-and-white image conversion, and object/text recognition in a way that makes use of the computing device's resources more efficient.

Example System Architectures

Figure 1:
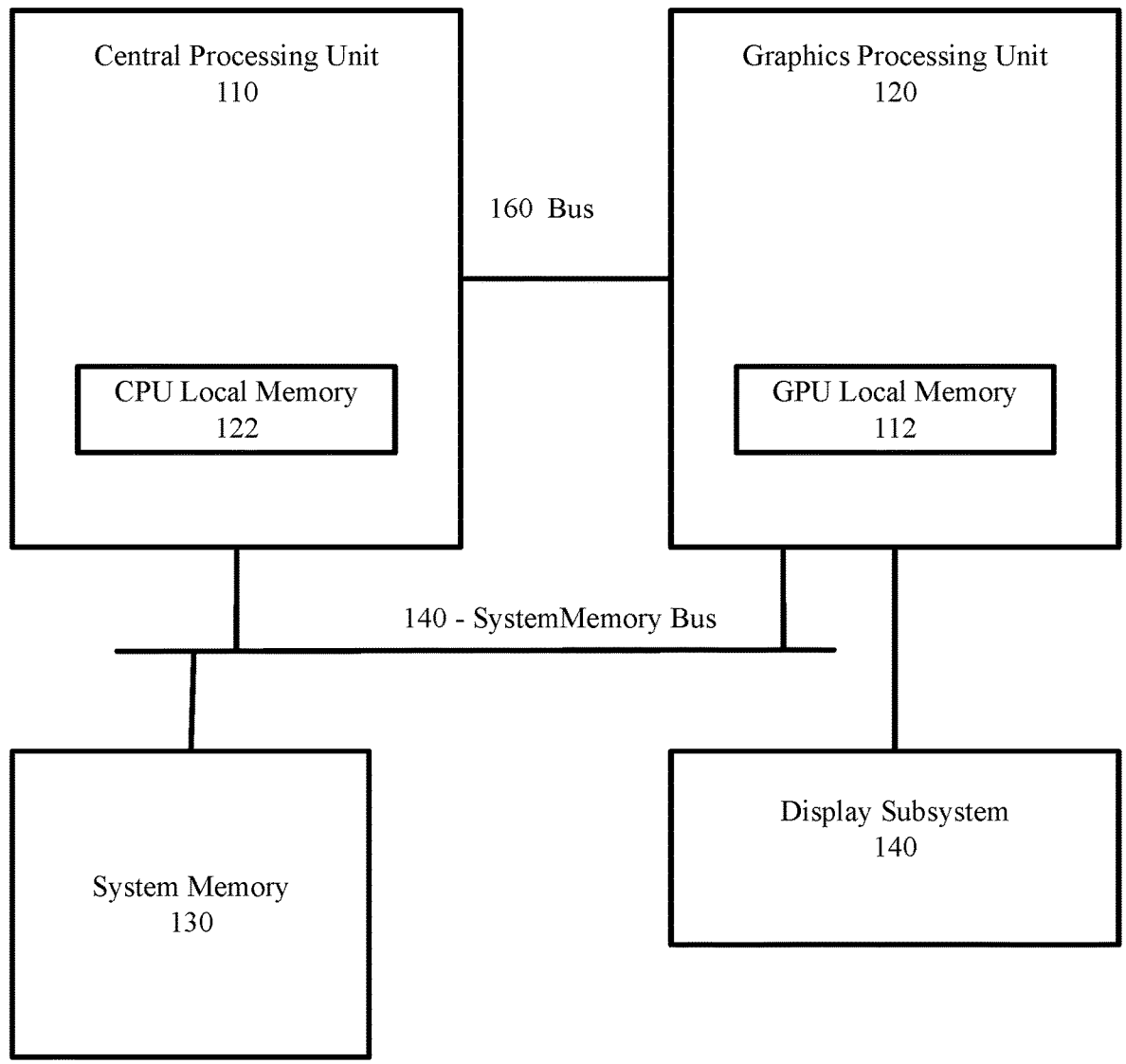
FIG. 1 is a block diagram depicting a portion of a simplified communications and processing architecture of a typical device offering a graphical user interface (GUI) in accordance with certain example examples.

FIG. 1 is a block diagram depicting a portion of a simplified communications and processing architecture 100 of a typical device offering a graphical user interface (GUI) in accordance with certain examples. While each element in shown in the architecture is represented by one instance of the element, multiple instances of each can be included. While certain aspects of operation of the present technology are presented in examples related to FIG. 1 to facilitate enablement of the claimed invention, additional features of the present technology, also facilitating enablement of the claimed invention, are disclosed elsewhere herein.

In such an architecture 100, a central processing unit (CPU) 110 and a graphics processing unit (GPU) 120 share access to system memory 130 via a system memory bus 140. The CPU 110 and the GPU 120 communicate messages and data over a bus 160 that may also connect to other processors, sensors, and interface devices (not shown). Each of CPU 110 and GPU 120 include local memory (CPU local memory 122, GPU local memory 112). Local memory can include cache memory. Cache memory stores data (or instructions, or both) so that future requests for that data can be served faster; the data stored in a cache might be the result of an earlier computation or a copy of data stored elsewhere. A cache hit occurs when the requested data can be found in a cache, while a cache miss occurs when it cannot. Cache hits are served by reading data from the cache, which typically is faster than recomputing a result or reading from a slower data store such as system memory 130 or transfer between the CPU 110 and GPU 120. Thus, the more requests that can be served from the cache, the faster the system performs. The GPU 120 typically operates on data from local memory to drive display subsystem 140. Throughout the discussion of examples, it should be understood that the terms "data" and "information" are used interchangeably herein to refer to text, images, audio, video, or any other form of information that can exist in a computer-based environment.

The architecture 100 illustrated is an example, and other means of establishing a communications link between the functional blocks can be used. Moreover, those having ordinary skill in the art having the benefit of the present disclosure will appreciate that the elements illustrated in FIG. 1 may have any of several other suitable computer system configurations. For example, the architecture 100 may be embodied as a mobile phone or handheld computer and may not include all the components described above.

Figure 10:
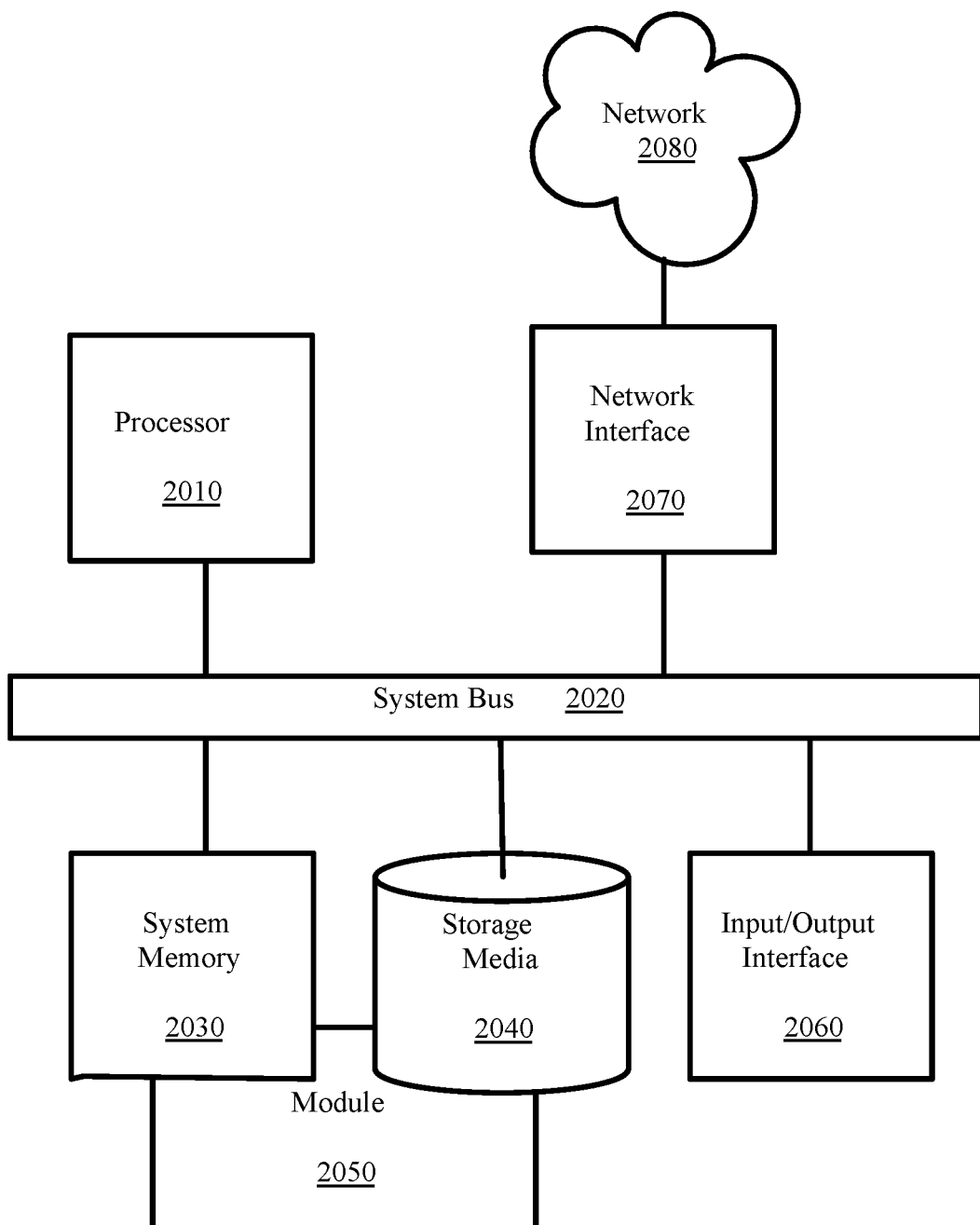
FIG. 10 is a block diagram depicting a computing machine and a modules, in accordance with certain examples.

In examples the technology presented herein may be part of any type of computing machine such as, but not limited to, those discussed in more detail with respect to FIG. 10. Furthermore, any modules associated with any of these computing machines, such as modules described herein or any other modules (scripts, web content, software, firmware, or hardware) associated with the technology presented herein may be any of the modules discussed in more detail with respect to FIG. 10. The computing machines discussed herein may communicate with one another as well as other computer machines or communication systems over one or more networks. The network may include any type of data or communications network, including any of the network technology discussed with respect to FIG. 10.

Example Processes

The example methods illustrated in the figures are described hereinafter with respect to the components of the example architecture 100. The example methods also can be performed with other systems and in other architectures. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 2, and continuing to refer to FIG. 1 for context, methods 200 to create image histograms are illustrated in accordance with certain examples. In such methods 200, a GPU 110 receives an input image—Block 210. The input image is composed of a two-dimensional array of pixel color values. For example, the color of a pixel can be represented by a vector having components for red, blue, and green color intensities of the pixel. Examples disclosed herein operated on input images of the OpenGL® "RGBA" format, but are not restricted to that format. OpenGL is a cross-language, cross-platform application programming interface (API) for rendering graphics. The API is typically used to interact with a GPU 110 to achieve hardware-accelerated rendering. OpenGL enables the use of programs called "shaders" to manipulated images. In addition to 8-bit values for each of red, green, and blue, the OpenGL RGBA format uses an 8-bit "A," or "alpha," component. The 8-bit format provides 256 discrete values from "0" to "255" for each pixel. The alpha component is typically used to represent the transparency of a pixel.

In OpenGL, color values can be stored in one of three ways: normalized integers, floating-point, or integral. Both normalized integer and floating-point formats will resolve, in a shader, to a vector of floating-point values; whereas integral formats will resolve to a vector of integers. Examples presented herein use the integral format for each of "R," "B," "G," and "A." While the OpenGL RGBA format can represent virtually any color of pixel, examples disclosed herein operate on "grayscale" images. In the OpenGL RGBA format, grayscale pixel values are represented by R=B=G, with any applicable A. For example, the pixel value (127, 127, 127, 255) represents a solid (A=max, solid) medium gray, the pixel value (0, 0, 0, 255) represents solid black, and the pixel value (255, 255, 255, 255) represents solid white.

Figure 3:
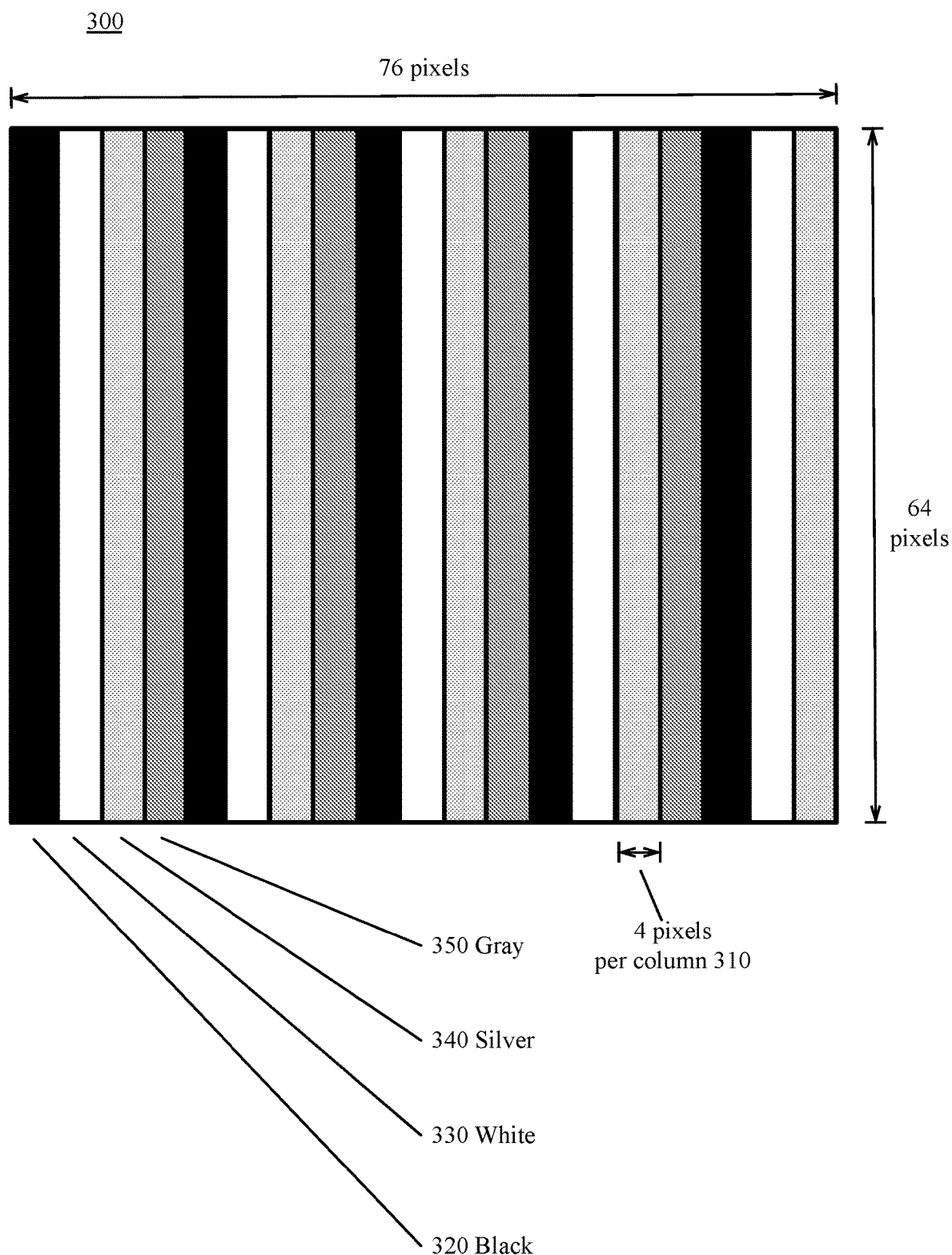
FIG. 3 depicts an input grayscale image, in accordance with certain examples.

Referring to FIG. 3, and continuing to refer to prior figures for context, an input grayscale image 300 is shown, in accordance with certain examples. In a continuing example, consider the 64 pixel high×76 pixel wide grayscale image 300 of FIG. 3. The image 300 consists of a pattern of vertical stripes—4 pixels wide of solid HTML black (0, 0, 0, 255) 320, 4 pixels wide of solid HTML white (255, 255, 255, 255) 330, 4 pixels wide of solid HTML silver (192, 192, 192, 255) 340, and 4 pixels wide of solid HTML gray (128, 128, 128, 255) 350. Note that this (black 320, white 330, silver 340, and gray 350) pattern repeats four full times, and then only the black 320, white 330, and silver 340 stripes repeat one additional time. As a result, there are (64×4×5) =1280 black pixels, 1280 white pixels, and 1280 silver pixels—but only (64×4×4)=1024 gray pixels.

For each particular input patch of pixels of a set of input patches partitioning the input image, and in parallel for each particular grayscale value the range, the GPU 110 counts the number of pixels in the particular input patch having the particular grayscale value—Block 220. TABLE 1 presents example pseudocode for performing this count.

TABLE 1

```
// Iterate over every pixel in the patch.
for x in range(start_x_pixel, end_x_pixel)
for y in range(start_y_pixel, end_y_pixel)
color = SampleColor(x, y)
gray_level = ToGrayscaleIntValue(color)
if (my_gray_level == gray_level) {
my_pixel_count = my_pixel_count + 1
}
}
EmitColor(CountToColor(my_pixel_count))
```

Figure 4:
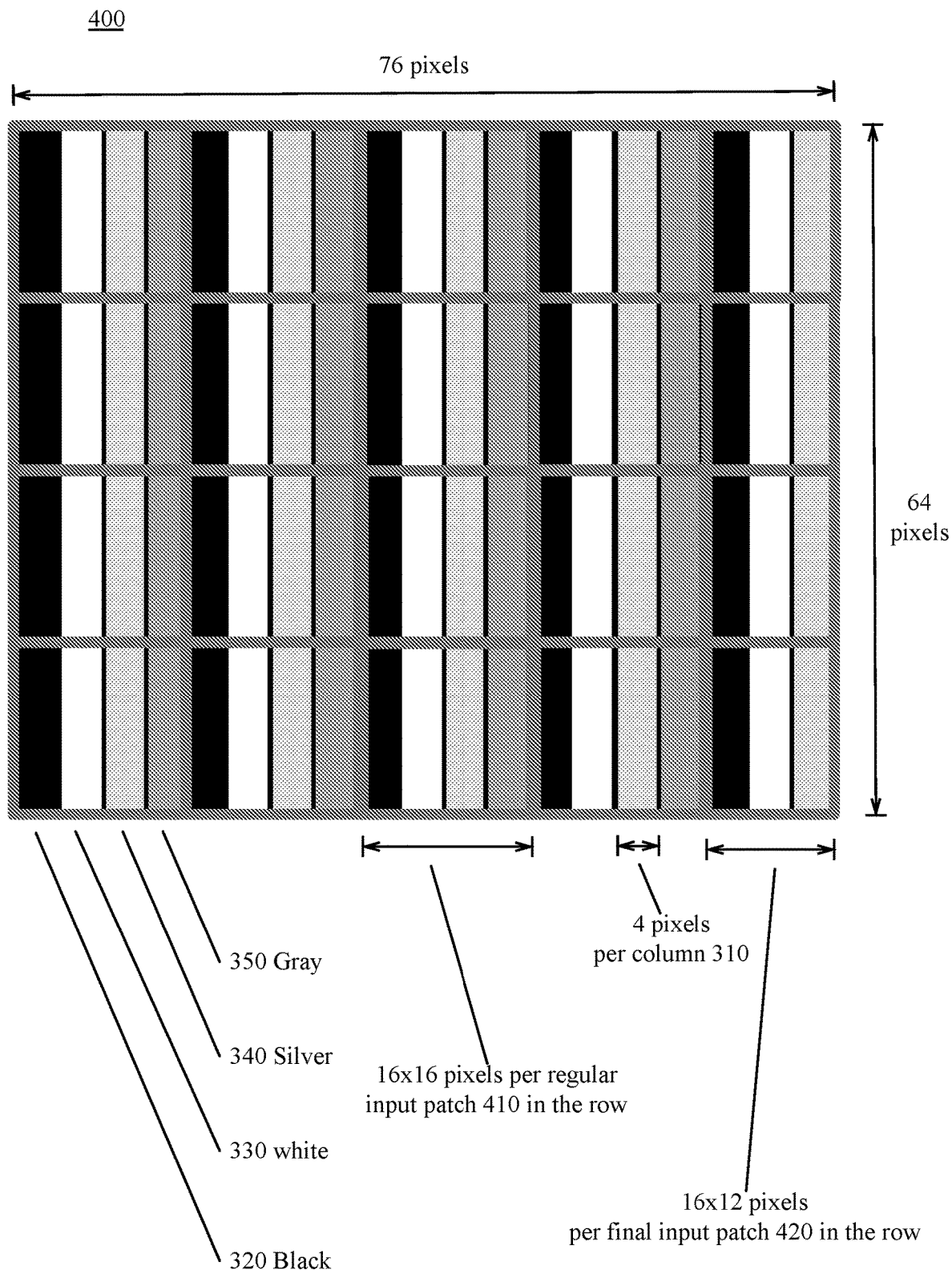
FIG. 4 illustrates an input grayscale image partitioned into input image patches, in accordance with certain examples.

Referring to FIG. 4, and continuing to refer to prior figures for context, the input grayscale image is shown partitioned into input image patches 410 and 420, in accordance with certain examples. In the continuing example, as shown in FIG. 4, 16 pixel×16 pixel input image patches are used as a basis. Each of four rows of such input image patches includes four full input image patches 410 and one 16 pixel high×12 pixel wide final input image patch 420. In some examples, uniformly dimensioned input image patches are used throughout without substantial changes to the technology.

The GPU uses OpenGL shaders to count the number of pixels of each of 256 grayscale values in each input patch. In the continuing example, all of the input patches have the same number of black, white and silver pixels—64. Sixteen of the twenty patches have 64 gray pixels, while the remaining four final input patches 420 have no gray pixels.

In parallel for each particular input patch of pixels of the set of input patches partitioning the input image, the shaders running on the GPU 110 create an output image patch as an ordered sequence of N pixels, with the color value of the nth pixel in each corresponding output patch representing the count of pixels in the particular input patch having the nth grayscale value—Block 230. In the continuing example, N=256—the number of different grayscale values in the OpenGL RBGA scheme.

It is important to note that the position of a pixel in a 16 pixel×16 pixel output image patch corresponds to a color in the OpenGL RBGA grayscale scheme. The value of the color of a given output image patch pixel corresponds to the count of pixels of that color in the input image. Note that a transformation has taken place—position in the output image patch corresponds to grayscale color, and color in the output image patch corresponds to count of input patch pixels of that grayscale color. Further, each output patch, including the output patches corresponding to 16 pixel×12 pixel input patches, is 16 pixels×16 pixels.

The shaders running on GPU 110 format the color value of each pixel in each output image patch in OpenGL RBGA unsigned integral format as a base 256 number with "R" as the least significant place, and "A" is the most significant place. However, to facilitate the use of the resulting output images in troubleshooting, the "A" place is formatted as the base 256 complement of its actual value in the count. Otherwise, in a typical use of "A," given that the "A" place is the most significant in the output image patch coding scheme, "A" will equal "0" (transparent) until well over 16,000,000 pixels of a given grayscale color are counted.

Figure 5:
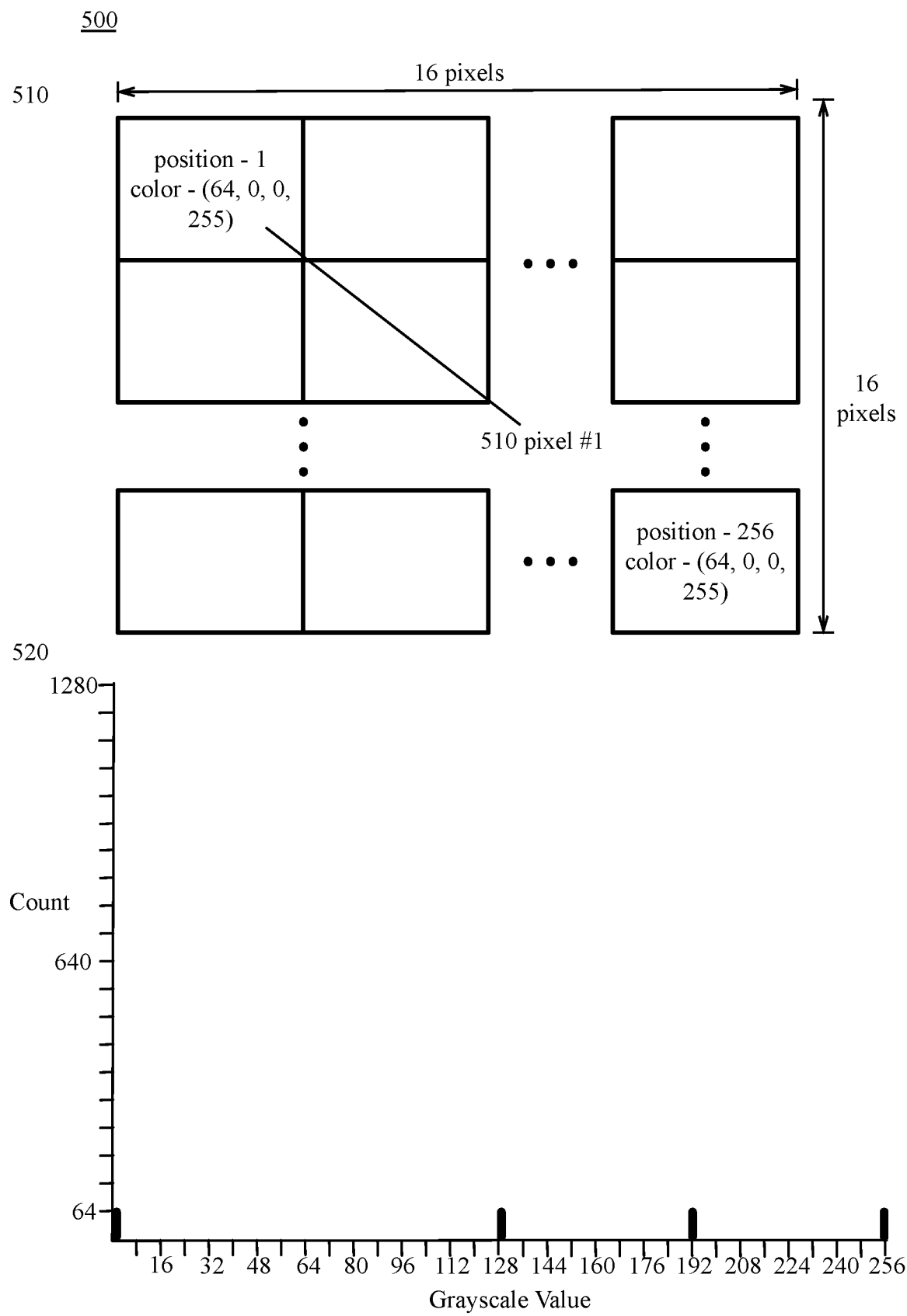
FIG. 5 illustrates an output patch pixels and as a histogram, in accordance with certain examples.

Referring to FIG. 5, and continuing to refer to prior figures for context, an output patch 500 is shown as pixels 510 (i, j), where n=(i−1)*16+j, and as a histogram 520, in accordance with examples of the present technology. In the output patch, the nth=$1^{st}$ pixel—(0, 0, 0, 0) in four-place base 256 notation—corresponds to the $1^{st}$ grayscale value (0, 0, 0, 255=complement$_{256}$ (0))—black.

In the continuing example, there are 64 pixels of the input image with the color value (0, 0, 0, 255)=black. The GPU sets the color value of the $1^{st}$ pixel in the output patch (an output patch position of the $1^{st}$ pixel in the $1^{st}$ row corresponding to black) to (64, 0, 0, 255)—a shade of red. There are 64 pixels of the input image with the color value (255, 255, 255, 255)=white. The GPU sets the color value of the $256^{st}$ pixel in the output patch (an output patch position corresponding to white) to (64, 0, 0, 255)—as with the first pixel, the same shade of red. There are 64 pixels of the input image with the color value (192, 192, 192, 255)=silver. The GPU sets the color value of the $193^{rd}$ pixel (the last pixel in the $12^{th}$ row of the output image patch) in the output patch (an output patch position corresponding to silver) to (64, 0, 0, 255)—as with the first and second pixels, a shade of red. And finally, there are 64 pixels of the input image with the color value (128, 128, 128, 255)=gray. The GPU sets the color value of the $129^{rd}$ pixel (the last pixel in the $12^{th}$ row of the output image patch) in the output patch (an output patch position corresponding to silver) to (64, 0, 0, 255)—as with the previous pixels, a shade of red. Note that the width of each histogram column has been lightly exaggerated for visibility.

After representing the grayscale histograms for each input patch as an output patch as described above, the GPU combines the output image patches into a single composite output image of N pixels—Block 240. The pixel value of the nth pixel in the single composite output image corresponding to the count of pixels in the input image having the nth grayscale value.

Figure 6:
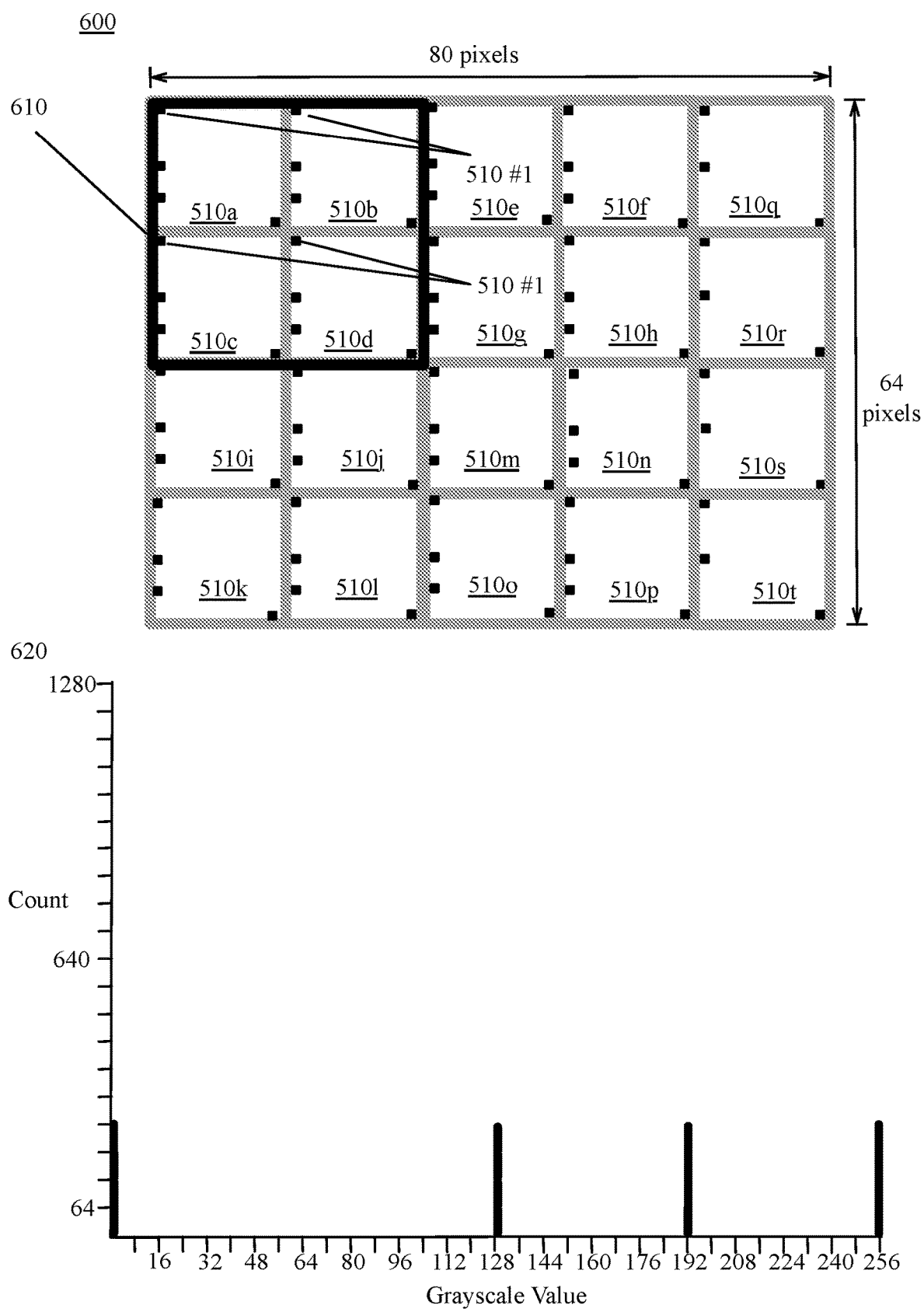
FIG. 6 illustrates two views of a histogram, in accordance with certain examples.

In the continuing example, for a hierarchical partition of the set of output image patches, wherein each hierarchical node has at least two children, the GPU sums, from the lowest level to the highest level, each nth pixel value. Referring to FIG. 6 and continuing to refer to prior figures for context, two views 610, 620 of a histogram 600 are shown, in accordance with examples of the present technology. In the continuing example, consider pixel #1 in each of output image patches 510a, 510b, 510c, and 510d. Each has the value (64, 0, 0, 255) or 64$_{256}$ (since the "R" place is the least significant base$_{256}$ place. The GPU sums the color values of each 510 #1 pixel from output image patches 510a, 510b, 510c, and 510d—giving 256, or in the notation of the present technology (0, 1, 0, 255), a very dark green. Histogram 620 reflects this count in the first histogram bar from the left. The GPU sums remaining groups of corresponding pixels from patches 510a, 510b, 510c, and 510d, resulting in the remaining bars shown in histogram 620. The GPU performs a parallel accumulation for output image patch sets {510e, 510f, 510g, 510h}, {510i, 510j, 510k, 510l}, and {510m, 510n, 510o, 510p}. The summing converts the digits to integers, adds the integers with carry, and then converts the integers back into floating point.

Figure 7:
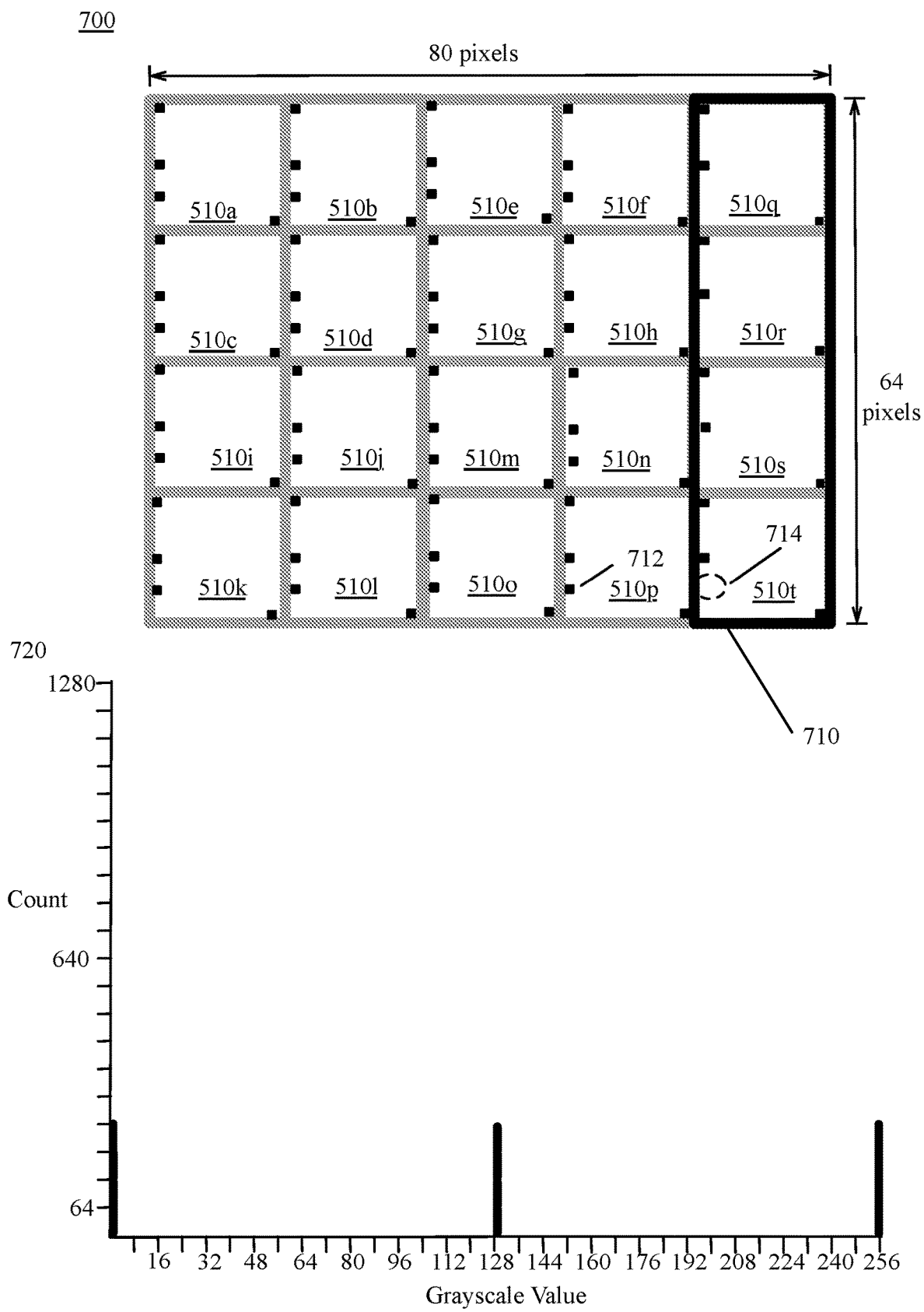
FIG. 7 illustrates two views of a summing of histograms, in accordance with certain examples.

Though as can be seen in FIG. 7, each of {510q, 510r, 510s, 510t} shows no count at pixel 714 (corresponding to gray)—as opposed to the value (64, 0, 0, 255) at pixel 712 in output patch 510$p$. The missing bar at grayscale value 129 in the corresponding histogram 720 is another view of the results of accumulating corresponding pixel counts from 16 pixel×16 pixel output patches {510$q$, 510$r$, 510$s$, 510$t$}.

Figure 8:
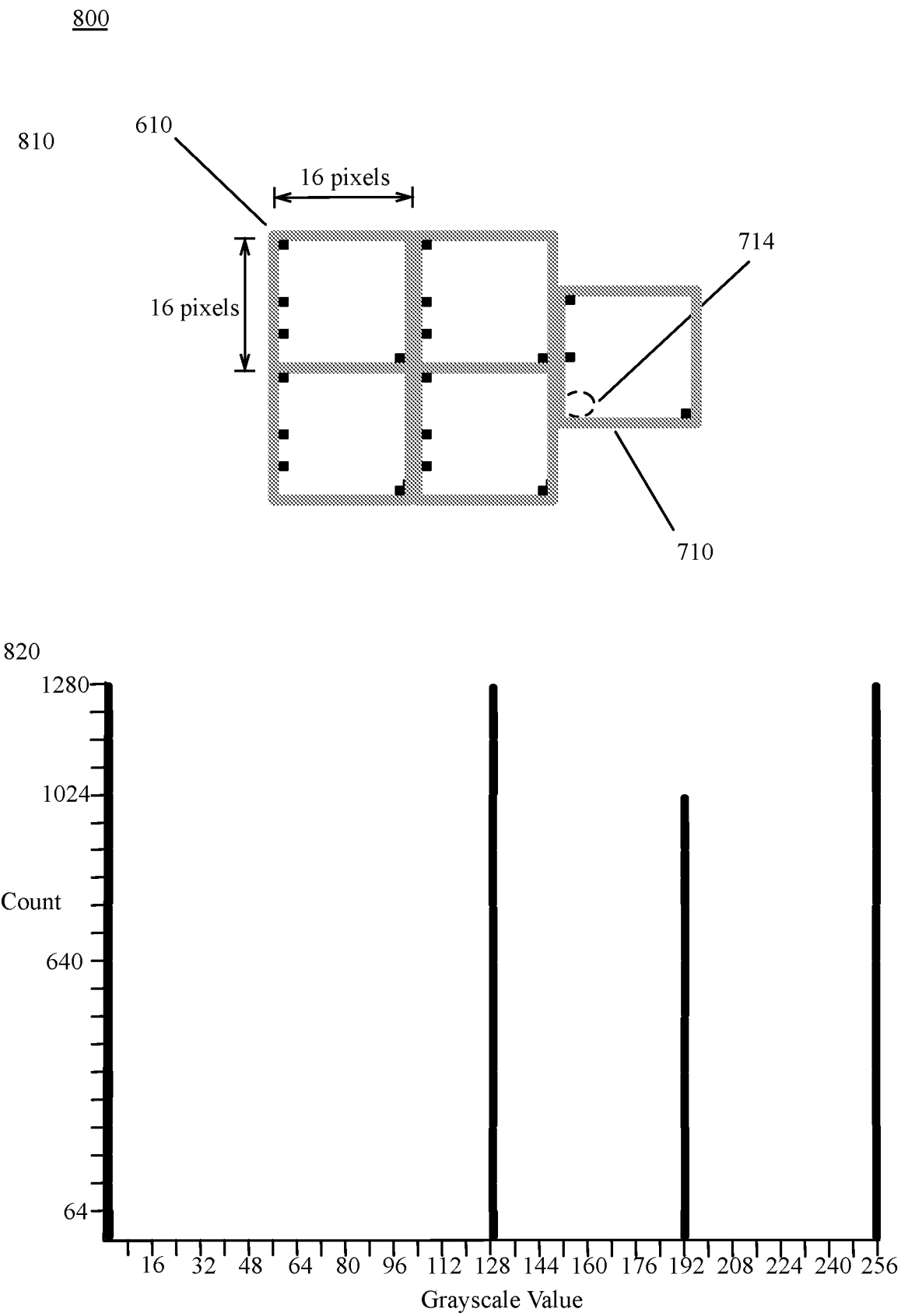
FIG. 8 illustrates the next-to-last and last stages of a histogram, in accordance with certain examples.
Figure 9:
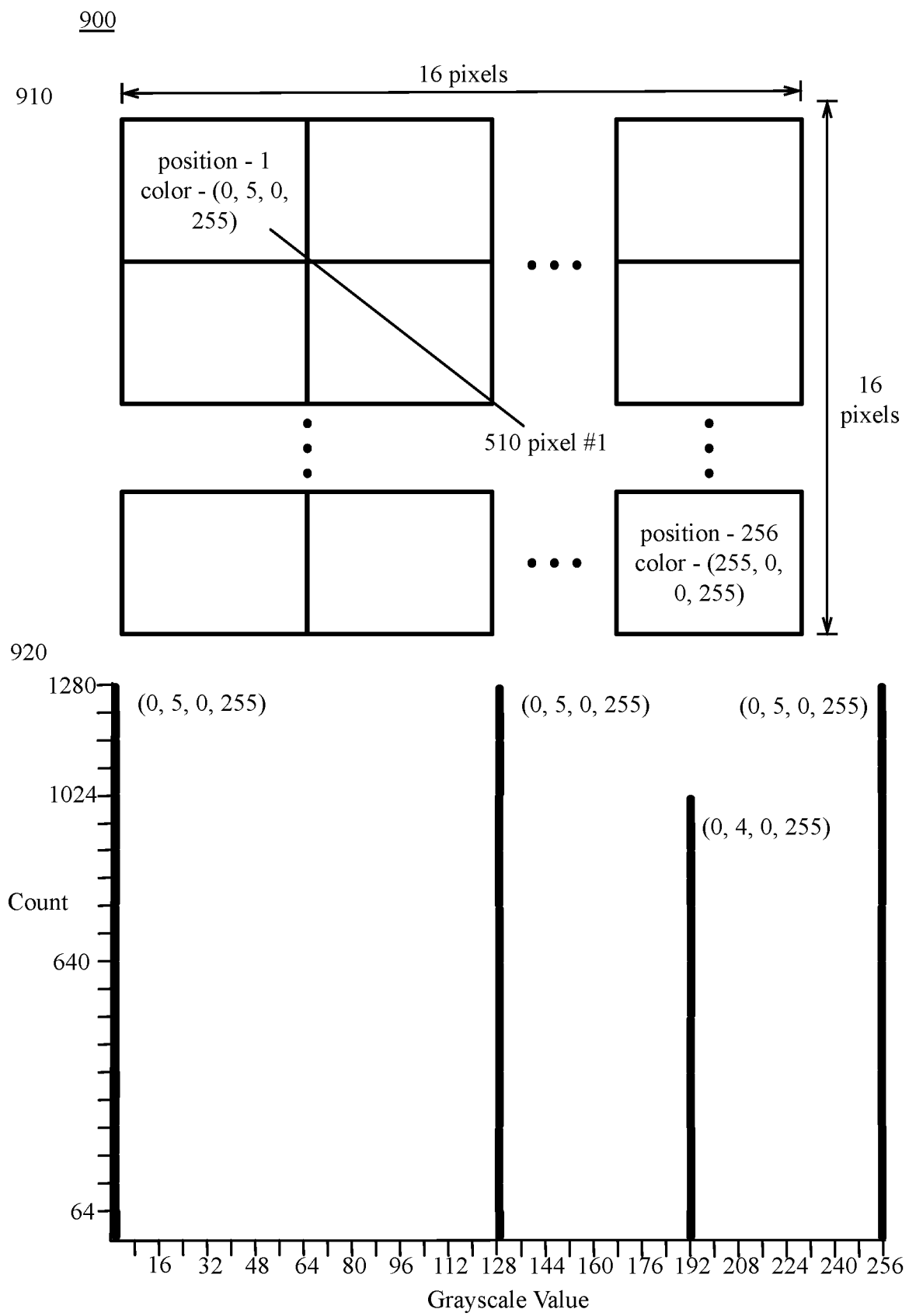
FIG. 9 illustrate the last stages of the output image histogram in both an image and as the histogram represented by the image, in accordance with certain examples.

Referring to FIG. 8, and continuing to refer to prior figures for context, 800 illustrates the next-to-last 810 and last 820 stages of a histogram, in accordance with examples of the present technology. After the processes described in connection with FIG. 6 and FIG. 7 have been completed, the GPU is storing five (5) 16 pixel×16 pixel patches, that the GPU sums in a pixel by pixel fashion to form histogram 820. Referring to FIG. 9, and continuing to refer to prior figures for context, 900 illustrates the last stages of the output image histogram in both an image and as the histogram represented by the image. In the continuing example, the 16 pixel×16 pixel output image patch 910 represents the same histogram of the original complete grayscale input image 300. The GPU assigns the pixels corresponding to black, silver, and white color values reflecting the count of each such color pixel from the original grayscale input image 300—the blue color value (0, 5, 0, 255), corresponding to the count 1280. The GPU assigns the pixel corresponding to the gray color value reflecting the count of each gray pixels from the original grayscale input image 300—the blue color value (0, 4, 0, 255), corresponding to the count 1024.

Other Examples

FIG. 10 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation to encompass such alternate examples.

Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

The invention claimed is:

1. A computer-implemented method to create grayscale histograms of input images, comprising:
   in a graphics processing unit (GPU):
   receiving an input image comprising an array of pixels, each pixel having a grayscale value from a range of N grayscale values;
   for each particular input patch of pixels of a set of input patches partitioning the input image:

in parallel for each particular grayscale value in the range, counting the number of pixels in the particular input patch having the particular grayscale value; and creating an output image patch as an ordered sequence of N pixels, with the color value of the nth pixel in each corresponding output patch representing the count of pixels in the particular input patch having the nth grayscale value;

formatting the color value at each pixel of the output image patch in RBGA unsigned integral format;

combining the output image patches into a single composite output image of N pixels, the pixel value of the nth pixel in the single composite output image corresponding to the count of pixels in the input image having the nth grayscale value; and generating an output image histogram comprising the composite output image.

2. The method of claim 1, wherein combining the output image patches into a single composite output image comprises:

for a hierarchical partition of the set of output image patches, wherein each hierarchical node has at least two children, summing, from the lowest level to the highest level, each nth pixel value.

3. The method of claim 2, wherein each output image patch is a 16×16 pixel array and each parent other than the hierarch has four children.

4. The computer-implemented method of claim 1, wherein formatting the color value at each pixel of the image patch in RBGA unsigned integral format further comprises formatting the color value at each pixel of the output image patch in OpenGL RBGA unsigned integral format as a base 256 number with "R" as a least significant place, and "A" as a most significant place.

5. The method of claim 1, wherein each output image patch a 16×16 pixel array.

6. The method of claim 1, wherein counting the number of pixels, creating the corresponding output image patch and combining the output image patches into a single composite image is performed on the GPU using one or more fragment shaders.

7. The method of claim 4, wherein "A" is formatted as a base 256 complement.

8. The computer-implemented method of claim 1, further comprising:

retrieving the output image histogram from the GPU; and performing imaging processing using the output image histogram.

9. A computer program product, comprising:

a non-transitory computer-readable storage device having computer-executable program instructions embodied thereon that when executed by a computer cause the computer to create grayscale histograms of input images:

in a graphics processing unit (GPU):

receive an input image comprising an array of pixels, each pixel having a grayscale value from a range of N grayscale values;

for each particular input patch of pixels of a set of input patches partitioning the input image:

in parallel for each particular grayscale value the range, count the number of pixels in the particular input patch having the particular grayscale value; and create an output image patch as an ordered sequence of N pixels, with the color value of the nth pixel in each corresponding output patch representing the count of pixels in the particular input patch having the nth grayscale value;

format the color value of each pixel in the output image patch in RBGA unsigned integral format; and combine the output image patches into a single composite output image of N pixels, the pixel value of the nth pixel in the single composite output image corresponding to the count of pixels in the input image having the nth grayscale value; and generate an output image histogram comprising the composite output image.

10. The computer program product of claim 9, wherein combining the output image patches into a single composite output image comprises:

for a hierarchical partition of the set of output image patches, wherein each hierarchical node has at least two children, summing, from the lowest level to the highest level, each nth pixel value.

11. The computer program product of claim 10, wherein each output image patch is a 16×16 pixel array and each parent other than the hierarch has four children.

12. The computer program product of claim 8, wherein formatting the color value at each pixel of the image patch in RBGA unsigned integral format further comprises formatting the color value at each pixel of the output image patch in OpenGL RBGA unsigned integral format as a base 256 number with "R" as a least significant place.

13. The computer program product of claim 12, wherein "A" is formatted as a base 256 complement.

14. The computer program product of claim 9, wherein each output image patch is a 16×16 pixel array.

15. The computer program product of claim 7, wherein counting the number of pixels, creating the corresponding output image patch, and combining the output image patches into a single composite image is performed on the GPU using one or more fragment shaders.

16. A system to process a registration of a user in a mobile payment service being one of a plurality of services supported by a service provider, comprising:

a storage device; and a processor communicatively coupled to the storage device, wherein the processor executes application code instructions that are stored in the storage device to cause the system to:

in a graphics processing unit (GPU):

receive an input image comprising an array of pixels, each pixel having a grayscale value from a range of N grayscale values;

for each particular input patch of pixels of a set of input patches partitioning the input image:

in parallel for each particular grayscale value the range, count the number of pixels in the particular input patch having the particular grayscale value; and create an output image patch as an ordered sequence of N pixels, with the color value of the nth pixel in each corresponding output patch representing the count of pixels in the particular input patch having the nth grayscale value;

format the color value of each pixel in the output image patch in RBGA unsigned integral format; and combine the output image patches into a single composite output image of N pixels, the pixel value of the nth pixel in the single composite output image corresponding to the count of pixels in the input image having the nth grayscale value; and generate an output image histogram comprising the composite output image.

17. The system of claim 16, wherein combining the output image patches into a single composite output image comprises:

for a hierarchical partition of the set of output image patches, wherein each hierarchical node has at least two children, summing, from the lowest level to the highest level, each nth pixel value.

18. The system of claim 17, wherein each output image patch is a 16×16 pixel array and each parent other than the hierarch has four children.

* * * * *